(12) United States Patent
Khandekar et al.

(10) Patent No.: US 7,577,722 B1
(45) Date of Patent: Aug. 18, 2009

(54) PROVISIONING OF COMPUTER SYSTEMS USING VIRTUAL MACHINES

(75) Inventors: Dilip Khandekar, San Jose, CA (US); Dragutin Petkovic, Saratoga, CA (US); Pratap Subrahmanyam, Sunnyvale, CA (US); Bich Cau Le, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 582 days.

(21) Appl. No.: 10/117,143

(22) Filed: Apr. 5, 2002

(51) Int. Cl.
*G06F 15/177* (2006.01)
*G06F 15/173* (2006.01)
*G06F 9/00* (2006.01)
*G06F 9/455* (2006.01)

(52) U.S. Cl. .................. 709/220; 709/221; 709/222; 709/223; 713/1; 718/1

(58) Field of Classification Search ......... 709/220–223; 718/1; 713/1
See application file for complete search history.

(56) References Cited

U.S. PATENT DOCUMENTS

| | | | |
|---|---|---|---|
| 6,453,392 B1 * | 9/2002 | Flynn, Jr. ................ | 711/151 |
| 6,535,977 B1 * | 3/2003 | Holle et al. .............. | 713/2 |
| 6,865,732 B1 * | 3/2005 | Morgan .................. | 717/140 |
| 6,978,232 B1 * | 12/2005 | Tobler .................... | 703/21 |
| 7,006,964 B2 * | 2/2006 | Aaltonen et al. ......... | 703/24 |
| 7,228,337 B1 * | 6/2007 | Bornstein et al. ........ | 709/217 |
| 7,448,079 B2 * | 11/2008 | Tremain ................... | 726/14 |
| 2002/0069369 A1 * | 6/2002 | Tremain ................... | 713/201 |
| 2002/0120660 A1 * | 8/2002 | Hay et al. ................ | 709/100 |
| 2002/0144257 A1 * | 10/2002 | Matsushima ............. | 717/178 |
| 2002/0156877 A1 * | 10/2002 | Lu et al. .................. | 709/221 |
| 2004/0268348 A1 * | 12/2004 | Waki et al. .............. | 718/1 |

FOREIGN PATENT DOCUMENTS

WO WO 02/03220 A2 1/2002

OTHER PUBLICATIONS

"ImageCast—Total PC Deployment and Image Management, Enterprise Edition," StorageSoft, Inc., 2000, (http://www.storagesoft.com/support/doc/imagecast/DS_imagecast_v45.pdf).
"AppNstall—Instant Application Deployment & Change Management, Enterprise Edition," StorageSoft, Inc., 2000, (http://www.storagesoft.com/support/doc/appnstall/DS_appnstall.pdf).

(Continued)

*Primary Examiner*—Nathan J Flynn
*Assistant Examiner*—Joshua Joo
(74) *Attorney, Agent, or Firm*—Rajeev Madnawat

(57) ABSTRACT

A provisioning server automatically configures a virtual machine (VM) according to user specifications and then deploys the VM on a physical host. The user may either choose from a list of pre-configured, ready-to-deploy VMs, or he may select which hardware, operating system and application(s) he would like the VM to have. The provisioning server then configures the VM accordingly, if the desired configuration is available, or it applies heuristics to configure a VM that best matches the user's request if it isn't. The invention also includes mechanisms for monitoring the status of VMs and hosts, for migrating VMs between hosts, and for creating a network of VMs.

10 Claims, 5 Drawing Sheets

OTHER PUBLICATIONS

"Altiris sXpress, Deployment Solution," Altiris, Inc., 2001, (http://www.altiris.com/products/docs/deploymentserver.pdf).

"Information Brief—IBM MANClient Control Manager version 3.0," IBM Corp., date unknown, (http://www.pc.ibm.com/us/infobrf/lccmv3.html.

BladeFrame—Enterprise-class Computing Built for the Data Center, Egenera, Inc. 2001, (http://www.egenera.com/pdf/BladeFrame_Brochure.pdf).

"Preboot Execution Envrionment (PXE) Specification," Version 2.1, Intel Corp., pp. 4 & 10-14, Sep. 20, 1999, (ftp://download.intel.com/ial/wfm/pxespec.pdf).

"INTEL Networking Technologies—Wake on LAN," Intel Corp., 1999 (http://www.intel.com/network/connectivity/resources/technologies/wake_on_lan.htm).

"Symantec Ghost 7.5," Symantec Corp., 2001 (http://enterprisesecurity.symantec.com/content/displaypdf.cfm?pdfid=34&PID=11175620&EID=0).

"PowerQuest—Powerful Solutions for deploying and upgrading computer systems," PowerQuest Corp., 2001, (http://www.powerquest.com/deploycenter/PDC50_EN_spec.pdf).

"RLX ServerBlade 800i," RLX Technologies, Inc., 2002 (http://www.rlxtechnologies.com/pdf/RLXDS_800i_v1.1.pdf).

Technical White Paper—Sun Enterprise 10000 Server: Dynamic System Domains, Sun Microsystems, Inc., Feb. 1999, (http://www.sun.com/servers/highend/10000/tour/domains.pdf).

"Rational TestManager," Rational Software Corp., 2002, (http://www.rational.com/media/products/testmanager/D327_TestManager.pdf).

* cited by examiner

PROVISIONING OF COMPUTER SYSTEMS USING VIRTUAL MACHINES

BACKGROUND OF THE INVENTION

1. Field of the Invention

This invention relates in general to the field of creating, configuring and deploying computer systems with user-specified features and in particular to an application of virtual machine technology.

2. Description of the Related Art

Few users of modern computers have managed to avoid the frustrations involved in configuring a new computer for use. Of course, one way to minimize set-up problems is to buy a "ready-made" computer with all software already loaded. This solution is often far from optimal, especially for more sophisticated users who may need a hardware and software configuration that is not common and therefore not offered at all, or only at unacceptable cost. Even for the normal user, however, the "computer-in-a-box" solution has the disadvantage of inflexibility—once the "box" is delivered, every new application and upgrade must be installed by the user.

Once a computer is configured, it must then also be managed and administered it on an ongoing basis. The tasks of configuration, management and administration are further complicated by the fact that a typical multi-user environment includes a large number of computers having a variety of operating systems and applications running in them. Furthermore, the demands for specific configurations of operating systems and applications often arise unpredictably, as they are needed. Provisioned computers may, for example, be needed for only a few minutes for some environments (for example, in the classroom, for quality assurance testing, etc.), a few days (for example, running simulations, analyzing data, etc.), or for longer periods (for example, in an IT department).

One solution that has been made possible by the growth of networks, especially the Internet, is "hosting," in which providers remotely take care of installation, configuration and maintenance not only of the physical machines and the Internet connectivity, but also of the applications running on them. This is advantageous for customers because it provides a comprehensive service that allows the users to outsource their application hosting and management needs.

A major component of the cost to the hosting providers who offer such a service is the need to provision machines and applications for new customers. A typical scenario of what happens when a new customer requests the provisioning and hosting service is that the customer logs onto the service provider's web site and, via a web browser, custom-configures a server by specifying the operating system and applications. These specifications identify the machine configuration that the hosting service provider needs to provision. Depending on the specifications, the provider will either need to provision a new machine, or may satisfy the user's request by creating a replica, that is, an additional instance of an existing machine. In either case, the service provider must find a suitable unused physical machine, install the required components, configure the machine, and install and configure the selected applications. The service provider then powers on the machine, whereupon further configuration of the machine and applications is often required. The system is then finally ready to be used by the customer. If there are other machines that need to be configured, the whole process is repeated.

The process of provisioning new computers for a given task has hitherto been very resource intensive, requiring much human intervention. Although some aspects of the various provisioning tasks can be automated, according to the prior art, the process is difficult to automate completely. This is because, for example, the machines themselves must be physically powered on and storage media such as CD-ROM disks and floppy disks must be physically inserted in the appropriate drives on the computer in order to install the operating system and/or applications. Technologies do exist to automate individual ones of these tasks, but it then becomes increasingly difficult to manage all of the tasks together. Examples or such existing technologies include the "Altiris eXpress" system deployment and software management products of Altiris, Inc., of Lindon, Utah; the "AppNstall" product of StorageSoft, Inc., of Lousiville, Colo.; the "IBM LANClient Control Manager" product of IBM Corp.; and the "BladeFrame" technology of Egenera, Inc.

Moreover, some tasks, like remotely powering on of machines, requires specialized hardware on the machines. Examples of such systems include the PXE ("Preboot Execution Environment") and "Wake on LAN" systems of Intel Corp. Another disadvantage is that a dedicated physical machine must typically be provided for each user.

There are still other solutions, such as "server blades," which attempt to share hardware resources, logical partitioning, etc., but even these solutions require specialized systems; note that a server blade is typically a single circuit board populated with components such as processors, memory, and network connections that are usually found on multiple boards. One of many examples of this solution is the "RLX ServerBlade 800i" made by RLX Technologies, Inc., of The Woodlands, Tex. An example of a scalable, logically partitionable server is the "Sun Enterprise 10000 Server" made by Sun Microsystems, Inc., of Palo Alto, Calif. This of course is usually both inefficient and expensive, since few users will need all of the processing power of a network server. To illustrate, consider the following major steps that are normally required for provisioning a new computer using the prior art:

1) Assembling hardware: The first step is to assemble the required hardware. Based on the requirements of the applications that need to run on the machine, the user specifies the amount of memory that needs to be installed, the number of disk drives and size of disk space required, the number of network cards needed, the number of CPUs required, etc. A system administrator then configures the hardware according to these specifications.

2) Installing the operating system (OS): The system administrator installs the OS by inserting an installation CD into a CD-ROM drive, which typically includes a "wizard" that guides the installer by presenting various questions to be answered. This is followed by installing the required service pack levels for the OS.

3) Installing applications: Any applications required by the user are then installed and configured on the newly created machine. This step is repeated for each application that is needed.

If replicas of an existing computer are to be deployed to meet the needs of the user, the system administrator follows the following main steps:

1) The OS and the applications on the computer that is to be replicated are copied using conventional disk imaging software, which creates an exact image of the bits on the computer's disk. This image represents the entire contents of the disk, including the boot record, the boot sectors, the system partition holding the OS and applications and data partitions, if any, holding additional software and or data.

2) The hardware for the new computer is then assembled as described above. Since it is assumed that the replica is to be identical to the original computer, the requirements for memory, the disk, etc., are simply taken from that computer, which acts as the "model computer" from which the replicas are derived.

3) The image created in the step 1 above is then installed on the new computer, which may usually also be done using the disk imaging software. Successful completion of this step results in the new computer's disk being an identical replica of the disk of the model computer.

4) The newly created computer is then an exact replica of the model computer. In order to function correctly in a network setting that includes the original as well, however, it needs to be given its own unique identify. The system administrator therefore gives this machine a new identity by assigning it a new hostname and a new IP address. Machines with Microsoft Windows operating systems also require each newly created machine to have a unique Security Identifier (SID). The administrator assigns SIDs to the respective replica computers by running specific, known tools for that purpose.

Another scenario where provisioning of computers is required is a Quality Assurance (QA), or testing lab: A product is typically tested against a very large set of configurations, that is, combinations of operating systems, service packs, patches and hot fixes, applications, etc. When a new version of the product to be tested is ready, a suite of tests is run on it for each and every such configuration. Usually, this is done by running the tests on small subsets of configurations by installing each configuration subset on a respective, separate computer. When a test completes, the current configuration subset is un-installed from the respective computer and a new subset of configurations is installed. This process is repeated until the product has been tested against all the configurations. This entire process is repeated the next time the tests have to be run.

Testing products exist that automate the task of running tests. The task of switching between computer configurations remains, however, mostly a manual operation. Examples of such products include the "TestDirector 7i" made by Mercury Interactive Corp. of Sunnyvale, Calif.; and the "Rational Test-Manager" made by the Rational Software Corp. of Cupertino, Calif.

Because of the large number of operating systems, each with a number of service packs, patches and hot fixes, and the large number of applications that a given product usually needs to be tested against, the number of configurations to be tested against can quickly grow into hundreds. Provisioning computers for each test cycle for all these configurations obviously requires significant time and human resources.

There are known variations on the above scheme that attempt to improve the turn-around time between configuration tests. One option, for example, is to maintain each configuration in a removable disk and then to shutdown a machine, swap the disks and boot the new configuration. Even this procedure is extremely resource- and personnel-intensive. Note that the disks themselves must be stored and managed separately. Another option is to partition the disks in the computers and to have each partition host a configuration. This reduces the need for managing disks separately, but does not reduce the time required to switch between configurations, because the computer running one configuration must be shut down and rebooted with another configuration. Not only is this method also resource-intensive, but it also requires a higher degree of skill in those involved.

From the perspective of hosting providers, or of those who simply configure and deliver computer systems to user, what is needed is therefore a system and method that allows them to easily and flexibly configure the systems to be hosted or provided, with a potentially wide range of available options. It should not be necessary to have a separate dedicated physical system for each user, and configuring systems should ideally be fully automated, or at least more so than is now possible. From the perspective of users, what is needed is greater flexibility in choosing computer configurations, with easy access to a wide range of options and with quick response. This invention provides such a system and related method of operation.

SUMMARY OF THE INVENTION

Figure 1:
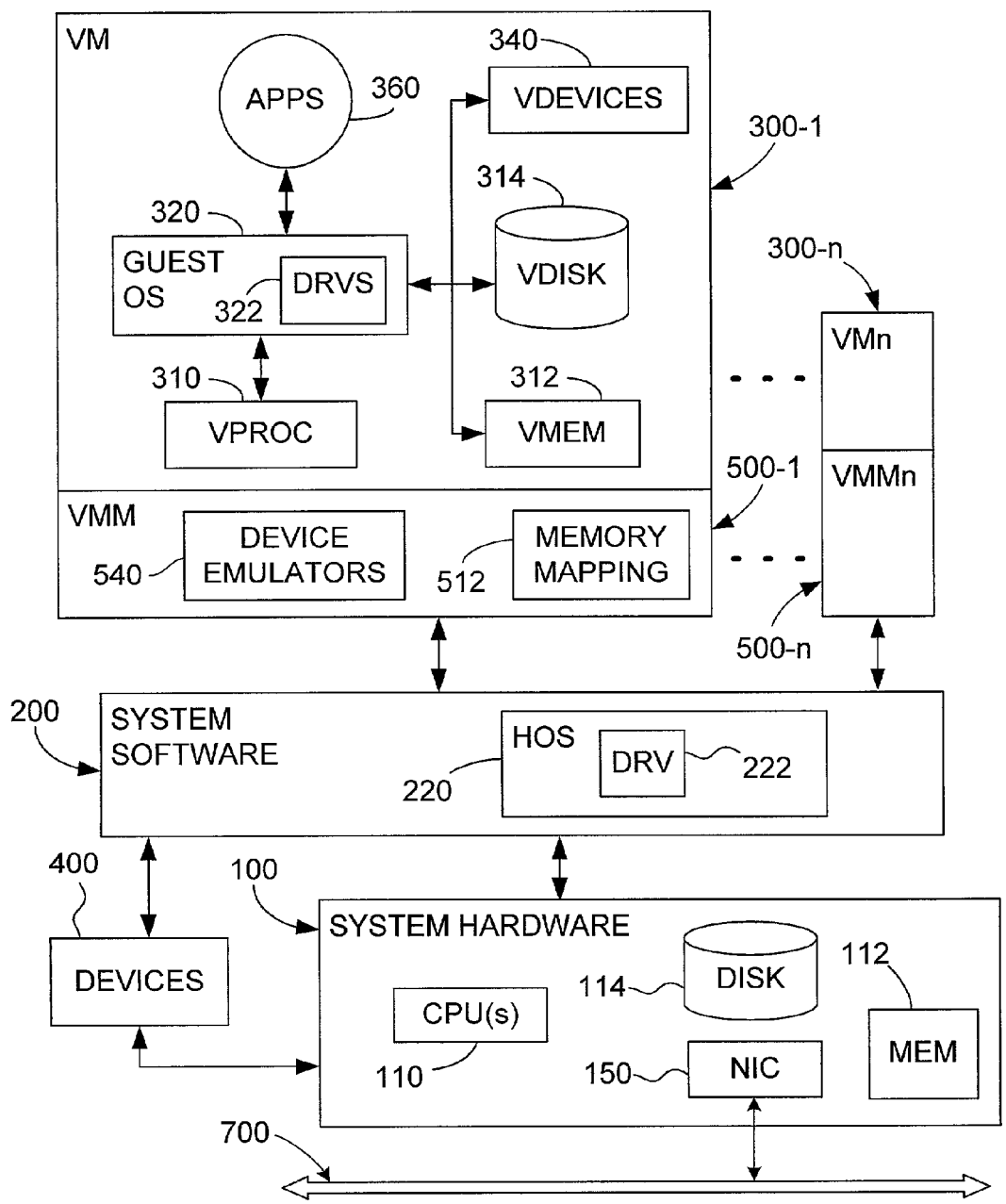
FIG. 1 is a block diagram that shows the main hardware and software components of a computer system that includes a virtual machine, as well as the typical components of a virtual machine itself.

The invention includes a method and system implementation for creating a virtualized computer system based on input information identifying a desired computer configuration. The invention then automatically configures and deploys on a physical host platform a virtual machine (VM) according to the inputted information.

In a preferred embodiment of the invention, a plurality of pre-configured VMs having different configurations are pre-stored. A requester (which will usually be a human user but may also be a computer program) then selects one of the pre-configured VMs, which is then automatically prepared for deployment.

In other embodiments of the invention, the requester specifies various components of the desired VM, including the characteristics of a desired operating system (OS), of a desired hardware platform, of desired applications, or of any combination of these components. The various components available for selection are stored in a database.

Once a VM has been configured and deployed, note that it will also be possible to alter its configuration, for example by upgrading the software and/or hardware, installing different applications, etc.

The invention also provides for heuristically selecting for and configuring the VM the available, stored components that best match the requester's specifications if these cannot be met exactly. Rather than specifying components, the requester may instead (or in addition) specify desired performance or functional goals for the VM.

In most embodiments of the invention, there is a plurality of physical hosts on which VMs can be deployed. In this case, according to another aspect of the preferred embodiment of the invention, the status of the hosts is monitored and the host on which a configured VM is to be deployed is selected heuristically. A deployed VM may also be migrated from one host to another based on the monitored status of the plurality of hosts.

According to another embodiment of the invention, a virtual machine-to-hardware interface, such as a virtual machine monitor (VMM), is installed on each of a plurality of hardware hosts. Deployment of the VM is thereby made substantially independent of the overall physical hardware configuration. At least one of the hosts is then selected as the host for actual VM deployment. Because each host plus interface forms a separate physical host platform, the actual host may be selected substantially arbitrarily, according to any given criterion.

The invention also allows for creation of a network of cooperating VMs. In this case, VMs are deployed on respective physical host platforms. At least two of the deployed virtual machines have installed in them different, mutually interacting applications.

One way to obtain information identifying the desired computer configuration is to input an image of an existing physical computer.

Rather than installing the configured VM directly on a physical host platform, it is also possible according to the invention to deploy the VM by copying information defining the VM onto a machine-readable storage medium such as a CD.

DETAILED DESCRIPTION

The invention enables users to configure, deploy and get access to substantially "customized" computer systems. In the preferred embodiment of the invention, this is done with no need for human intervention. In broadest terms, the invention makes this possible by allowing the user either to select one of a set of "model" virtual machines that are pre-built with such components as virtual hardware, an operating system and one or more applications, or to specify desired components that are then assembled into a virtual machine. The chosen or specified virtual machine is then loaded onto a physical platform such as a host server. The user can then use the virtual machine as if it were a dedicated computer.

Because more than one virtual machine can normally be installed on a single host server, and will be fully isolated from other virtual machines installed on the same host, the number of users who may have "dedicated" systems is not limited to the number of available physical servers, yet there will be no loss of security. Moreover, thanks to the properties of virtual machines, each user's provisioned virtual machine(s) can be migrated to other hosts as needed, or even exported for running on other servers or systems, including the user's own, in which case the numbers of virtual machines and users is essentially unlimited. Before the specific novel features of the different embodiments of the invention are described, certain key concepts and structures are explained.

General System Configuration

FIG. 1 shows the main components of a computer system that includes one or more virtual machines (VMs). The illustrated system includes an underlying system hardware platform 100, system software 200, and a plurality of virtual machines (VMs) 300-1, . . . , 300-n that run on the system software 200; the hardware platform 100 and the system software 200 thus form a "host" for the VMs.

As in most computers, two different types of data storage are commonly provided: a system memory 112, typically implemented using any of the various RAM technologies, and a non-volatile storage medium such as one or more disks 114. FIG. 1 also shows that conventional peripheral devices 400 may be connected to run on the hardware 100 via the system software 200. Note that the disk 114 itself, from the perspective of the system hardware and software, is also a "peripheral" device.

The system hardware 100 includes one or more central processors CPU(s) 110, which may be a single processor, or two or more cooperating processors in a known multiprocessor arrangement. As in other known systems, the hardware includes, or is connected to, conventional registers, interrupt-handling circuitry, etc. Any conventional network interface device such as one or more cards 150 may also be included to enable communication and data transfer with external systems via a network 700. The network 700 may be of any known type, both publicly accessible networks such as the Internet and proprietary networks, and may be either wired or wireless or both.

The system software 200 either is or at least includes an operating system (OS), shown in FIG. 1 as a "host operating system" HOS 220, which will include drivers 222 as needed for controlling and communicating with the various devices 400 and, usually, for the disk 114 as well. Because this invention does not presuppose any particular host operating system, and because the characteristics and functions of operating systems are so well known, the HOS 220 is not discussed in greater detail, except insofar as it cooperates with the components of the system unique to the invention.

Virtual Machines

As is well known in computer science, a virtual machine (VM), which is sometimes also referred to as a "virtual computer," is a software abstraction—a "virtualization"—of an actual physical computer system. Actual execution of instructions for the VM is ultimately carried out on the system hardware 100, so that the VM may be considered to be a "guest" system running on the "host" platform, which includes the system hardware and software 100, 200. Like physical computers, each VM will typically include one or more virtual CPUs 310 (VPROC), a guest operating system 320 (which may, but need not, simply be a copy of a conventional, commodity OS), virtual system memory 312 (VMEM), a virtual disk 314 (VDISK), optional virtual peripheral devices 340 (VDEVICES) and drivers 322 (DRVS) for handling the virtual devices 340, all of which are implemented in software to emulate the corresponding components of an actual computer. Although the key components of only one VM are illustrated in FIG. 1, the structure of other VMs will be essentially identical.

Of course, most computers are intended to run various applications, and VMs are usually no exception. Consequently, by way of example, FIG. 1 illustrates one or more applications 360 installed to run at user level on the guest OS 320; any number of applications, including none at all, may be loaded for running on the guest OS, limited only by the requirements of the VM itself. Usually, no modifications of any kind are needed in order to install applications on a VM as opposed to on a "real" computer. If the VM is properly designed, then the applications (that is, the user of the applications) will not "know" that they are not running directly on "real" hardware. Of course, all of the applications and the components of the VM are instructions and data stored in memory, just as any other software.

The concept, design and operation of virtual machines are well known in the field of computer science. One should keep in mind, though, that because all of the components of a virtual machine are software, or software constructs, a VM can be defined completely by its code and state information.

Virtual Machine Monitors

Some interface is usually required between a VM and the underlying host platform, in particular, between the VM and the host OS 220, which is the "real" OS in the sense of being either the native OS of the underlying physical computer, or the OS or other system-level software that handles actual I/O operations, takes faults and interrupts, etc. As is mentioned above, the host platform is responsible for actually executing VM-issued instructions and transferring data to and from the actual, physical memory 112 and storage devices 114. This interface is often referred to as a "virtual machine monitor" (VMM).

A VMM is usually a thin piece of software that runs directly on top of the host and virtualizes all, or at least some of, the resources of the machine, or at least of some machine. In some systems, the VMM may even be included in the system software itself, or operate alongside it at system level. In some conventional systems, VMMs run directly on the underlying system hardware 100, and will thus act as the "real" operating system for its associated VM. In other systems, such as the one shown in FIG. 1, the HOS 220 is interposed as a software layer between VMMs and the hardware. Still other arrangements are possible, all of which may be used in the invention. Regardless of which level the VMM is implemented on, the interface exported to the respective VM is the same as the hardware interface of the machine, or at least of some predefined hardware platform, so that the guest OS 320 usually cannot determine the presence of the VMM. The VMM also usually tracks and either forwards (to the HOS 220) or itself schedules and handles all requests by its VM for machine resources as well as various faults and interrupts. The general features of VMMs are known in the art and are therefore not discussed in detail here.

In FIG. 1, VMMs 500-1, ..., 500-n, are shown, acting as interfaces for their respective attached VMs 300-1, ..., 300-1n. It would also be possible to use a single VMM to act as the interface to all VMs, although it will in many cases be more difficult to switch between the different contexts of the various VMs (for example, if different VMs use different guest operating systems) than it is simply to include a separate VMM for each VM. The important point is simply that some well-defined, known interface should be provided between each VM and the underlying system hardware 100 and software 200.

Because operation of the VM requires some form of interface with the host platform, from the perspective of the system designer the VM and VMM can be considered to form a single cooperating system, although, as is mentioned above the VMM is typically transparent to the VM. The important point to keep in mind when it comes to this invention is that the VM is structured and performs as a complete "real" computer system, even though it is a software construct and assumes an interface such as the VMM.

Each VMM will typically include other software components such as device emulators 540 that emulate the characteristics of respective physical devices. Such components, and others such as an interrupt handler, etc., are common in VMMs, but a description of these components is not necessary to understanding this invention and is therefore not included here; these components are well known in the art of computer virtualization.

In conventional, non-virtualized systems, memory is usually partitioned into units such as "pages," each of which has a page number. The actual machine memory is addressed using "machine page numbers" (MPNs), whereas the operating system allocates and the processor generates pages of "virtual memory," identified by virtual page numbers (VPNs). A memory mapping unit then translates VPNs to MPNs. This single level of addressing indirection makes it possible to easily relocate processes simply by changing the appropriate mappings. These concepts are well known in the art and are explained, for example, in the standard text "Computer Organization and Design: The Hardware/Software Interface," David A. Patterson and John L. Hennessey, Morgan Kaufmann Publishers, ISBN 1-55860-428-6, 1998, pp. 579-93.

Virtualization introduces an extra level of addressing indirection: The guest operating system allocates pages of virtual memory, which are then mapped to "physical" pages (PPNs), which the VM "believes" are the same as actual machine pages, but which in fact are an intermediate addressing structure. The VMM therefore usually includes a memory mapping module 512 to translate, that is, map, physical page numbers to machine page numbers.

One advantage of this extra level of indirection is that each VM can be isolated from all others, and from all software other than the VMM, which itself will be transparent to the VM; indeed, the user of a VM will often be completely unaware the VM is not a "real" computer. Moreover, each VM as a whole is therefore also relocatable to other systems as long as these other systems have the same memory structure and the appropriate mappings are established in the VMM.

Because of the isolation of VMs, components ranging from applications to even the virtual processor 310 and guest OS 320 can therefore be added, deleted or modified with no effect on any other VM. In the context of this invention, another advantage is that each VM will operate essentially as a "self-contained" computer completely within a virtual address space that is defined by the VMM. As a result, a change in mapping of physical addresses can be accomplished in a manner that is transparent to the VM, and that does not require modifications to either the guest OS 320 or to the underlying host operating system HOS 220. As long as the VMM is configured appropriately, any VM may therefore be migrated freely, even to other hardware and software platforms, and complete, exact images, that is, copies, of a VM may be created, which will function exactly like the VM from which they were copied.

In the following description of the invention, merely for the sake of simplicity, only one VM/VMM pair is discussed. The discussion applies equally, however, to all such VM/VMM pairs that may be included in any given implementation of the invention. Moreover, it will be assumed below that when a VM is installed on a host, then a corresponding VMM is either already installed on the host, or is included and installed together with the VM.

Definition of Various Key Terms

Before proceeding with the description of the various embodiments of the invention described below, it is helpful to keep in mind the definitions of several terms that are used throughout the description.

A "model virtual machine" is a virtual machine (VM) that contains a certain configuration of guest operating system 320, service pack, and applications 360, where the applications have been tested and are known to work correctly. A model VM may be used to provision new VMs with the same configuration.

"Staging" is the step of taking the model VM and stripping off its identity (Security ID in Microsoft Windows operating systems, IP Address, etc.) and configuring it such that next time it is booted, it runs a tool to assign a new identity (a new SID, computer name, IP address, etc.), and to perform any other setup required as per user requirements. A VM thus prepared is referred to as a "staged VM."

"Deployment" is the step of taking a staged VM, copying it to a host machine and letting it configure with a new identity. The process of deployment is complete when the virtual machine is ready to be accessed and used by a user.

"Cloning" is the step of copying the virtual machine configuration file and disk images to a new host machine or to a different location in the same host machine.

"Migration" is the step of moving a virtual machine configuration file and disk images from one host to another, un-registering it at the original host and registering it at the new host, such that the VM is operational on the new, target host.

VM Provisioning General Architecture

Figure 2:
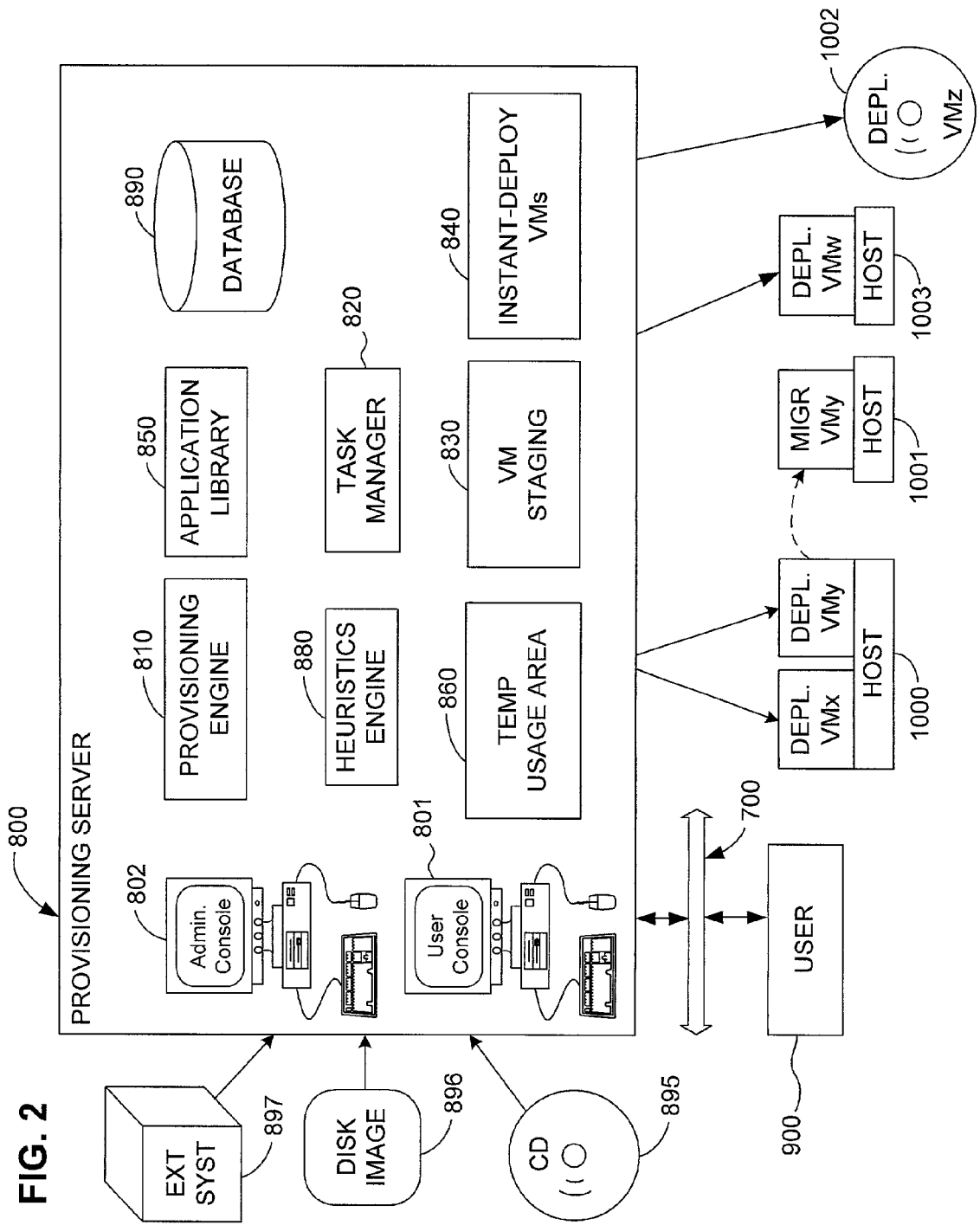
FIG. 2 illustrates the general principle of virtual machine provisioning according to the invention.

FIG. 2 shows the main components of the preferred embodiment of the invention, which allows VMs to be created and provisioned by cloning one of a set of model VMs, or by starting from scratch and installing an operating system, and then installing and configuring additional software according to user specifications. The invention provides the user with three choices:

1) Clone an existing, pre-built model VM and configure a few parameters, such as host name, IP address, etc.

2) Install an operating system and/or one or more applications to a VM created from scratch and then configure them. Such a VM is referred to below as a "custom-built" VM.

3) Instantly provision a VM by resuming it from a suspended state. Such a VM is referred to below as a an "instant-deploy" VM.

The main feature of the invention is a VM provisioning server 800, which, like any conventional computer system, will include system hardware, system software, devices, etc. as needed; these are standard components of any computer and are therefore not described in further detail. The term "server" is used here in a loose sense to identify the set of tasks it performs.

Although not necessary to this invention, each of the components that comprise the server 800 could, for example, actually reside on separate physical machines. Even in that case, the separate machines are referred to here collectively as the "provisioning server" 800. The computer(s) used to implement the provisioning server 800 are thus whichever computer system(s) are used to provide the VM provisioning service according to the invention. In the preferred embodiment of the invention, these machines are configured as a network server, and conventional network server technology may be used to implement it. The term "server" is not, however, intended to limit the invention to use with any particular hardware platform.

One or more users 900 communicate with the provisioning server 800 via their own respective computer systems and a network 700, such as the Internet, or over any other known channel. Users may be individuals, groups, service providers, etc., in short, any person or entity who wants one or more VMs to be created and deployed according to their specifications. A "user" could also be a software application or tool. The provisioning server 800 in the preferred embodiment of the invention includes a front-end presentation layer—a user console 801—by means of which end users interact with the provisioning server to specify various input parameters. Software applications acting as a user interact with the provisioning server using a well-defined programmatic interface (API), which may be designed in a known manner. Another presentation layer—an administration console 802—is preferably also included, by means of which an administrator interacts with the provisioning server to monitor the operational state of the various computers, to maintain the database (see below), etc.

The main idea of the invention is that a user who wants access to a computer with specific configuration characteristics interacts with the provisioning server 800, and, by means of the user console 801 (or via the network, using conventional technology) selects components of the computer that he wants to have. These components are the system hardware, the system software (in particular, the OS), and one or more applications (if any). The user thus specifies the hardware characteristics of the desired machine, such as memory size, number, type and size of disks, number of network cards, etc. One such component is an operating system. In addition to selecting a preferred operation system, the user will usually also need to specify the desired OS configuration, for example, hostname, IP address, MAC address of the network cards, etc. Finally, the user selects the additional applications he wants to have installed on the machine, and submits the request to the provisioning server.

Any conventional interface may be used in the user console 801 to present the various options to the user and to submit the selected options to the provisioning server. For example, for pre-built VMs, a list of available staged VMs, along with a description of their respective (virtual) hardware platform, system software, and pre-installed applications (if any) could be presented for display; the user may then select one of the VMs from the list using known methods. In the case of custom-built VMs, pull-down menus or similar graphical input devices may instead be included to allow separate specification of VM components such as a hardware platform, OS, and applications.

A heuristics engine 880 within the provisioning server then takes this user input and applies heuristics/rules to select the most appropriate VM from a library 830 of staged VMs. At least one host computer 1000, 1001 is made available to the provisioning server, and the heuristics engine 880 also selects which host machine 1000, 1001 is most appropriate to provision and deploy the VM on. The heuristics engine 880 also selects the applications from a library 850 of available applications to install in the newly created VM. The system designer will be able to determine which heuristics/rules to implement in the heuristics engine 880 using known design criteria. Known expert systems, "intelligent assistants," and other knowledge-based systems and engines that can be embedded in other products and loaded with domain knowledge may be included in the heuristics engine 880 to implement the various decision functions.

The heuristics engine 880 preferably also applies rules to validate user input for both correctness and consistency. For example, it will check that the memory size is sufficient for the requested operating system and the set of applications. If the user-entered parameters cannot be implemented as input, then the heuristics engine preferably also applies known rules to suggest changes.

In FIG. 2, By way of example, two VMs—VMx and VMy—are shown as having been deployed, that is, installed for running, on host 1000. Note that, just as in the standard configuration of FIG. 1, any number of VMs may be deployed and loaded on a single host, limited only by the capacity of the host itself. Similarly, in FIG. 2, only two hosts 1000, 1001 are shown merely for the sake of simplicity. Any number of host systems may be included; indeed, in the case where the hosts are external to the system according to the invention and are controlled by or designated by the users, the number of possible hosts is essentially unlimited.

Before starting the process of provisioning, the provisioning server preferably creates a temporary usage area 860 for the provisioning request that holds the user input as well as the various temporary data needed while the provisioning task is in progress. Finally, the provisioning server initiates a new transaction using a task manager 820, which returns a task identifier (task ID) to the user.

In a prototype of the invention, the entire process of provisioning a new machine for the user could take anywhere from a few seconds, for instant-deploy VMs, to a few minutes in case of pre-built VMs and possibly even hours in the case of custom-built VMs. While waiting, the user can query the provisioning server via the user console 801 with the task ID to find out the progress of the task. The status returned is, for example, the stage the provisioning task is in and, if possible, the percent of the stage completed; whether a failure has occurred and, if so, a failure message, etc.

In the preferred embodiment of the invention, the user is given some choice about how the provisioned VM's virtual hardware, system software, and applications are selected. Each such VM is therefore at least partially customized. If the user's configuration preferences cannot be matched exactly, then the heuristics engine 880 suggests the best available match by applying a database of heuristic rules about properties of VMs, available applications and operating systems, virtualized devices, etc.

According to an alternative "instant-deployment" embodiment of the invention, the user selects one of a plurality of fully configured VMs, which are stored in a library 840 of instant deployment VMs and are kept in a suspended state until deployed. The provisioning server then selects an appropriate host 1000, 1001 on which to provision the VM, copies the necessary data on that host, and resumes the execution of the VM on the new host. The VM is thus instantly available to the user for use. Whereas configuring a VM based on a selection of components may take a few minutes, the process of provisioning a new, pre-configured VM takes only a few seconds and the user can start using it almost instantaneously. Since the host servers have to have a hardware configuration identical to that where the VM was suspended, the heuristics engine will select the appropriate host server to deploy the VM on.

Different choices for virtual hardware, system software, and applications may be stored in respective libraries using any known data structures. For example, one such library could contain the code of different operating systems such as Linux Red Hat, Windows 2000, Windows Me, etc., and/or different versions or releases of a single operating system, as well as other system software such as drivers, etc. By offering even older, legacy operating systems as options, users could, for example, test a newly designed application for backwards compatibility, with no need to reconfigure their own physical machines or to configure a dedicated physical machine. In the preferred embodiment of the invention, the operating systems are pre-installed in virtual machines, which are then stored as staged-VMs ready for deployment.

Another library (such as library 850) could contain code for any collection of the myriad of existing applications, from web servers, database servers, spreadsheets and word-processing programs, to games and browsers. Still another library could contain the code for various virtualized system hardware components such as processors, memory devices, etc., and yet another library could contain the virtualization code for hardware devices such as graphics cards, disks, network interface devices, etc.

Presenting a set of available operating systems, applications, virtualized hardware, etc., for the user to select from has the advantage that the properties of the presented components will be known and compatibility can be assured. Especially in the case of applications, however, for which installation into a VM is well understood and straightforward, it would also be possible to allow the user himself to upload to the provisioning server one or more applications he wishes the provisioning server to install in a provisioned VM, or to include in the application library for use by others. Alternatively, the user could designate a network address from which the provisioning server itself could upload the application(s). Such uploading of applications should of course follow a well-defined and preferably standardized protocol. Assume, for example, that a user has developed a software application, but wishes to test it for backwards compatibility with a legacy operating system. The user could then select that desired legacy OS, but then direct the provisioning server to install the application to be tested, for example, by selecting a choice such as "other" or "user-selected" from the menu item for "Applications" displayed on the console 801.

The procedure for building a model VM from selected components will typically not be simply a matter of storing the components in the same place. For example, many applications have settings and parameters that depend on the operating system they will be running on, and an operating system will have parameters that depend on which processor it is installed on. One way to overcome these complications is to store in the library 850 different copies of applications, with different settings for the different possible operating systems, different copies of operating systems configured for different processors, etc.

It is possible that the user does not know just how he wants a VM to be configured, or that he wishes the VM to include one or more components that the library 830 does not have. Thus, neither a ready-assembled, "stock" VM nor a user-configured, custom-built VM is available that exactly matches the user's preferred specifications. In yet another alternative embodiment of the invention, the heuristics engine 880 inputs information about the user's intended tasks and performance specifications and/or even functional goals and then suggests an entire VM that implements these in some optimal sense. For example, a user could indicate that he wants the system according to the invention to build a (virtual) web server running a Window OS that can handle 2000 requests ("hits") per second, and the heuristics engine 880 will pass parameters to other components such that they will build a VM having the desired characteristics.

In the preferred embodiment of the invention, hosting is provided to users by the same entity that controls the provisioning server 800. In this embodiment, hosting is preferably provided using a bank or "farm" of servers, each forming one of the hosts. Users then access the hosts as they would any other servers and interact with the respective deployed VM via the network in a conventional manner. One advantage of including the hosts within the overall provisioning system is that the system administrator can ensure that staged and deployed VMs are operating properly. This embodiment of the invention therefore provides the same function as conventional hosting, but with much greater flexibility, no need for human intervention to configure, install and maintain the user-selected "computer," no need to physically power on a computer, and, assuming sufficient server capacity, no need to install additional physical equipment in order to increase the number of hosted systems.

Moreover, the concern that a hosting server might fail is also reduced, because the VMs deployed on any malfunctioning server (depending on the malfunction, of course), or on a server that is due for maintenance, can be migrated to another host server. Easy migration also means that VMs can be deployed to hosts with the greatest current available capacity. For example, in FIG. 2, virtual machine VMy is shown as having been migrated (or copied) from host 1000 to host 1001. Information about the current state of the different hosts is preferably input dynamically into a database or other data structure in the heuristics engine 880. Host state information can then be used to suggest components, as well as the properties of VMs that need to be matched with user requests and any static rules pre-defined by the system administrator. The heuristics engine may then also efficiently direct deployment and migration in order to balance the load on the different available hosts, for example by deploying a selected, staged VM to the host whose processor currently has the most available cycles.

If automated VM provisioning is not required or desired in a given case, as FIG. 2 illustrates, a staged VM could also be delivered to a user in the form of a storage device such as a CD, DVD or tape 1002, which the user can then load into his own chosen computer system in the conventional manner. The staged VM could also be delivered to the user via a network such as the Internet, using any known transfer protocol.

As is mentioned above, a VMM is typically included for each VM in order to act as its software interface with the underlying host system. In the preferred embodiment of the invention, a VMM is already pre-installed on each host 1000, 1001 so as to ensure compatibility and proper configuration. Several products are available from VMware, Inc. of Palo Alto, Calif., that configure conventional computers, both stand-alone desktop computers and multi-user servers, to load and run multiple VMs. It would also be possible, however, for a corresponding VMM to be included along with each staged VM, as long as the characteristics of the host on which the VM is to be installed are known. An advantage of pre-installing a VMM, without a VM, on a plurality of hosts, such as hosts 1000, 1001, 1003, is that it will then be possible to deploy a given VM on any arbitrary one (or more) of these hosts. Moreover, as long as the VMM on each host exports a known hardware interface to the VM deployed on it, then VM deployment will be substantially independent of the actual physical hardware configuration.

Once a VM is deployed on a host, it may be started ("powered on") in any conventional manner, either by the provisioning server remotely, or by the user himself. Note that powering on a VM does not normally involve a manual action, but rather can be carried out through a software procedure. Since a VM operates as a "regular" computer, the user may then also load other applications into the deployed VM and run them as any other.

The deployed VMs can be monitored regularly so that any unexpected event, like the crash of the operating system in the VM, can be reported to the user or administrator. Also, maintenance tasks like upgrade of software and hardware (for example, activating a different number of processors, memory chips, etc.) installation of service packs or hot fixes, detection of virus, etc., can be run by the administrative component of the provisioning server. Hosts can be monitored for load and if the load crosses a threshold, the administrator can be alerted and/or actions can be taken such as migrating VMs to a lightly loaded server. For example, in FIG. 2, virtual machine VMy is shown as having been migrated (or copied) from host 1000 to host 1001.

COMPONENTS OF THE PREFERRED EMBODIMENT OF THE INVENTION

The description above gives a general overview of the workings of the invention. In the following sections, the individual components of the provisioning server in the preferred embodiment of the invention are described in detail.

User Console 801

The user console is preferably a web server, with which the user interacts with any conventional web browser. When the user logs in to the provisioning server, he can either chose to custom-provision a VM or can select any pre-configured, instantly deployable VM in the library 840.

In order to provision an instantly deployable VM, the console 801 need present only a single dialog to the user (although more may of course be included as needed). This VM configuration selection dialog may be as simple as a drop-down list of available VM configurations. A brief description of the operating system, service pack and set of applications installed in each instantly deployable VM is preferably also included, and known techniques may be implemented to enable the user to view additional details of any of the configurations. When the user selects a configuration, the heuristics engine 880 applies the heuristics and rules to determine the best host, and provisions the VM on that host. The user can then access the newly created VM via any known remote access software, such as the remote console software available from VMware, Inc., of Palo Alto, Calif.

In order to provision a pre-built VM, the console 801 preferably presents a dialog to the user to select the model VM to provision and allows the user to specify additional configuration parameters such as the host name, IP address, etc. The user may also be presented with an optional dialog where he can query the details of the model VM, such as its OS, applications, etc.).

In order to provision a custom-built VM, the console 801 preferably presents three primary dialogs for the user as follows, relating to hardware selection, OS selection, and application selection:

1) Hardware Selection Dialog

The user specifies the various (virtual) hardware components of a VM in order for the provisioning server to be able to create the VM. The various parameters that the user will normally need to specify are:

a) The main memory (RAM) of the VM. The user preferably specifies both minimum and maximum amounts. The amount of memory required will depend on the application(s) that the user desires to run and the typical workload. The desired amount will be sufficient to run the workload efficiently; the minimum amount will be that which is required for the workload to run at all. The provisioning server will try to provision a VM with the desired amount of memory. However, in case it is not able to, it will try to provision a VM with less as long as it is greater than the minimum required. Note that one of the heuristics and rules included in the engine 880 may be a database of the minimum and recommended amounts of RAM for the different OSs and applications available for provisioning.

b) The disks of the VM. The VM created by the provisioning server will contain a (virtual) disk that has the OS and selected applications installed. If the user wants additional disks for the VM, he specifies the number of disks wanted, as well as the type (for example, SCSI or IDE) and the size of each disk. The user can also specify the amount of data he expects these disks to contain, that is, the actual size of these disks. The provisioning server will then, as before, try to allocate the most appropriate host to provision the new VM on such that the disks can grow as needed to their maximum sizes. In case no such host is found, the provisioning server (in particular, the heuristics engine 880) selects the best host that has enough storage space to host the disks with expected amount of data.

c) Networking. The preferred system configuration is such that all hosts 1000, 1001, etc. are connected by a local area network (LAN), which allows for easy communication, and VM deployment and migration. The VM created by the provisioning server is therefore preferably provided with one network card in a bridged mode. The VM thus also becomes available on the LAN as a machine that can be reached from any other machine in the LAN and the VM can reach any other machine in the LAN. The user can request the provisioning server to configure additional network cards and/or change the networking to be host-only. The advantage of configuring the VM with host-only networking is that the VM then is not accessible on the LAN, so other machines in the LAN cannot get to it. This might be a desired feature for example, for short-lived machines which do not need to participate in the network.

2) OS Selection Dialog

The next step is for the user to select the operating system and, if needed, the service pack level desired. The user console 801 therefore presents the user with a drop-down list of available OS and service pack combinations and the user selects one. Information about the available OSs and service packs may be stored, for example, in database 890.

3) Application Selection Dialog

After the VM virtual hardware and OS have been selected, the user then selects the applications he wants installed in the VM. The list of available applications preselited to the user will depend on the selected OS—only applications that are able to run on the selected OS are presented. The user can select any number of applications or none at all.

When the user has finished making the above selections, he submits the request to the provisioning engine 810, which creates a new VM by the process described below. As soon as the process is initiated, a new transaction is started in the task manager 820 and the user is returned a task ID. The user can then query the status of the task or can abort the task before it completes. When the task completes successfully, the VM will have been created and the user is so informed, for example, via the browser from which he submitted the request, or by email. The user can then access the VM using remote access software.

Figure 3:
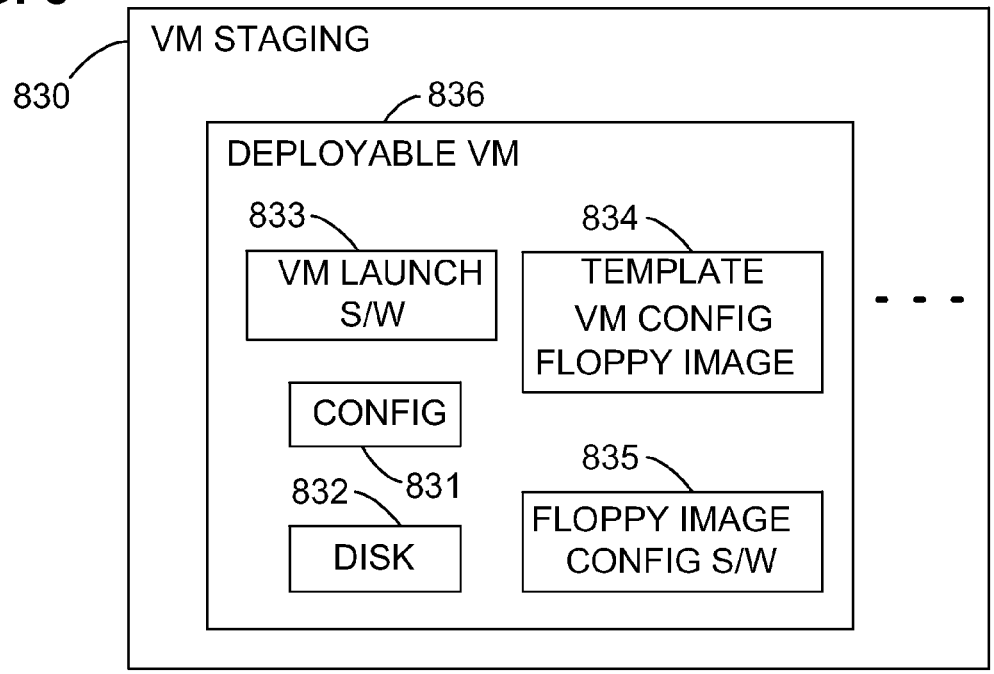
FIGS. 3-6 illustrate certain components of a provisioning server according to the preferred embodiment of the invention, namely, a virtual machine staging subsystem, a subsystem that provides instantly-deployable virtual machines, an application library, and a temporary usage area, respectively.

VM Staging 830—FIG. 3

See FIG. 3. This component of the provisioning server contains model VMs that have been prepared for deployment. In the preferred embodiment of the invention, pre-built VMs will be stored with their operating systems and applications installed, whereas custom-built VMs will be stored with just their operating systems installed. In FIG. 3, a single, staged, deployable VM is illustrated; as indicated by the ellipsis, however, any number of deployable VMs may be staged. Preparation is a two-step process, namely, creation of the model VM and then staging of this VM:

1) In the first step, a model VM is created and the necessary OS and applications are installed in it. FIG. 2 illustrates various options involved in installing the OS and applications in the VM after it is created from scratch.

a) Installation from an install CD 895 or ISO image. This is the most common way of installing an OS in a VM. The user (or administrator) inserts the CD 895 in the conventional CD-ROM drive of the VM staging server 830 and powers on the VM. After installing the OS, the user (or administrator) inserts the CDs for the desired applications and installs them as normal.

b) Installation from a disk image 896. Especially in the area of quality assurance and testing, users often have a library of disk drive images that they use to deploy physical machines. See, for example, the "Ghost 7.5" technology of Symantec Corp. of Cupertino, Calif. According to the invention, the model VM can also be created from one of these images. One other advantage of this procedure is that the VM thus created from the ghost image of the physical machine will be a working replica of the machine and can therefore function as a backup clone. The client-side of the disk imaging software is run in a newly created VM, typically using a boot floppy, whose software downloads the disk image and installs it on the VM's virtual disk. Since the hardware configuration registered in the disk image is very likely different than the hardware configuration of the VM, the disk may have to be "repaired" after the disk image is installed.

Typically, the hardware abstraction layer (HAL) and the kernel of the operating system need to be replaced with the versions appropriate for the VM's virtual hardware. Similarly, device drivers for devices that are different in VMs need to be replaced as well. For example, the device driver software for the disk in the VM will typically need to be installed and configured. Such repair may be carried out in the staging server using known techniques.

c) Import of a physical machine 897. A variant of the method of installation from a disk image is to create the disk image by extracting the disk image of an existing physical machine 897. The image may then be installed in the VM's virtual disk. As in the case of installation from a disk image, the virtual machine disk may need to be repaired (as discussed above) after the image is installed. Disk image extraction may be done using known techniques.

2) After the model VM is created as described above, it is then prepared for being staged for deployment. This in turn involves two steps. First, install software is included within the VM to assist in provisioning. The task of this software (shown as the VM launch software module 833) is to configure the operating system parameters such as the computer name, IP address, etc., to establish a connection (a shared folder, for example) to the server hosting the temporary usage area 860, and to start the application installation process (if necessary). Second, software tools loaded in the model VM are then executed to strip off the computer's identity (in case of Microsoft Windows, the security identifier) and to schedule to run the launch software 833 the next time the VM boots.

After the above steps are completed, the guest operating system in the VM is shut down and the VM is powered down (for the VM, a software procedure). This VM is then ready to be deployed and is stored as one of the staged VMs 830. This VM may then also be added to the database 890. For each VM, the data sets kept in the VM staging server 830 are illustrated in FIG. 3 and are as follows:

1) The VM configuration ("config") file 831.

2) VM disk files 832.

3) A launch software module 833, which is installed inside the VM and resides on the disk 832.

4) A template VM configuration floppy image 834, which is used by a provisioning engine 810 at the time of deployment to provide the data to the VM launch software 833 at the time of boot to enable the VM to configure itself according to externally specified parameters. This is discussed in more detail below.

5) A software module 835 for creating a floppy image starting from the template floppy image 834 and customized according to the user input. This is also discussed in more detail below.

In the preferred embodiment of the invention, the disks of the VM are configured in an hierarchical fashion and are stored in a shared storage area accessible from the staging server as well as the host servers where the VMs are deployed.

The disks are configured using known REDO log technology, where a disk may have a REDO log associated with it, the REDO log may itself have another REDO log, and so on. The hierarchy thus forms "layers" where the base disk is at the innermost layer and the REDO logs are at the outer layers. When the OS attempts to read a disk sector, it is served from the outermost layer if the sector is present there. If not, inner layers are queried until the sector is fetched from the innermost layer or the base disk. When the operating system writes a disk sector, it is written to the outermost layer. Thus, all layers except the outermost are immutable, and can be shared by more than one VM.

There are three possibilities of disk layout for provisioning a VM:

1) Only the outermost layer is cloned for the newly created VM and all other layers are shared with other VMs. This results in a fast provisioning process, since the disk layer that needs to be copied is typically small in size.

2) No layers are shared and the entire disk is copied for the new VM. This results in a slow provisioning process, but may be necessary in environments that do not have a shared storage network.

3) As a combination of the two techniques above, the entire disk may be copied to a host server; however, the VMs on that host server may share the disk's inner layers as in option 1 above. This results in fast provisioning of subsequent VMs after the first one has been deployed on a host server, even in the absence of a shared storage network.

Figure 4:
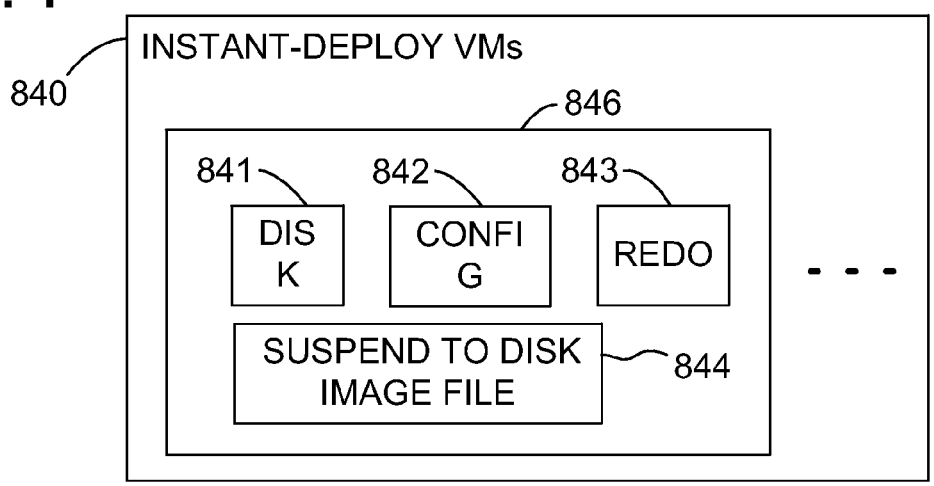

Instantly-Deployable VMs 840—FIG. 4

This component of the provisioning server 800 contains fully configured VMs that are suspended and are ready to be instantly deployed. In the preferred embodiment of the invention, these ready-to-deploy VMs (one of which is indicated with reference number 846) are created as follows. First, a new VM is created according to the steps outlined above in the section on VM Staging. User accounts are then created in the VM and include user names and passwords that the users can use when accessing the VM. The VM's guest OS 320 is then shut down and the VM's virtual disk 314 is switched to a non-persistent mode. The VM is then powered on again (once again, a software procedure) and, when it is fully booted, it is suspended. A virtual disk file 841 is preferably stored in a network share folder so that it is accessible from any machine in the LAN. A REDO log file 843, as well as a suspend-to-disk image file 844 and a VM config file 842 are then preferably also stored as part of the instant-deploy VM 846. The VM will then be ready to be deployed (see the deployment section below), and may also be added to the database 890.

In an alternative embodiment of the invention, the REDO log file 843 and the suspend-to-disk image file 844 are created by suspending the VM on the host server the first time it is deployed there. This involves copying the config file, powering on the VM and, when the operating system is booted, suspending it. The subsequent deployment of the VM on the host server can then use the REDO log and the suspend-to-disk image file local to the host server. This process is useful when there are differences in hardware between the host server and the provisioning server such that a VM suspended on one machine may not be successfully resumed on another.

Instant-deploy VMs are especially attractive in situations where VMs are very short-lived. Typical scenarios are found in the testing and QA environment, where the VM is provisioned to run a set of tests and is then discarded. Another example is a demo environment, where the VM is required only to run a demo.

Database 890

The database 890 (see FIG. 2) is a central repository of data required by the various components of the provisioning server. In the preferred embodiment of the invention, this database includes the following information:

1) Instantly deployable VMs: This is a data structure indexed by the name of the VM configuration, and contains the following fields:
   a) Name of the configuration (primary key)
   b) Operating system
   c) Service pack level for the OS
   d) List of applications available
   e) List of users configured with accounts on the machine
   f) Location of the VM in the instantly-deployable VMs repository 840.

2) Staging VMs: This data structure is required for provisioning pre-built or custom-built VMs and contains the following fields:
   a) Operating system name (primary key)
   b) Service pack level for the operating system
   c) List of applications available in the VM
   d) List of users configured with accounts on this VM
   e) Location of the VM in the VM staging repository 830.

3) Applications: This data structure keeps information about the applications available for installation in a custom-built VM and has, for example, the following fields:
   a) Name of the application (primary key)
   b) List of operating systems it runs on
   c) Location of the application software in the application library 850
   d) Information on hardware properties it needs, such as minimum CPU, memory, disk space, etc.

4) Host servers: This data structure keeps information about the hosts available to deploy VMs on, and has the following fields:
   a) Name of the host (primary key)
   b) Number of VMs deployed on the server
   c) Hardware configuration of the host (memory size, disk space, etc.)
   d) Other information required by the heuristic engine to make decision on deployment.

5) Users: This data structure keeps information about the users authorized to access the provisioning server and the deployed VMs, and has the following keys: 20% a) User name (primary key)
   b) Authorization level (administrator, can provision a VM, can only access a deployed VM, etc.)
   c) Usage statistics (number of times the user provisioned a VM, amount of time the user accessed deployed VMs, etc.)

The user console consults the database 890 to present the user with the choices of VM configuration, operating system and/or application when they are to specify their choices for custom-built VMs.

Figure 5:
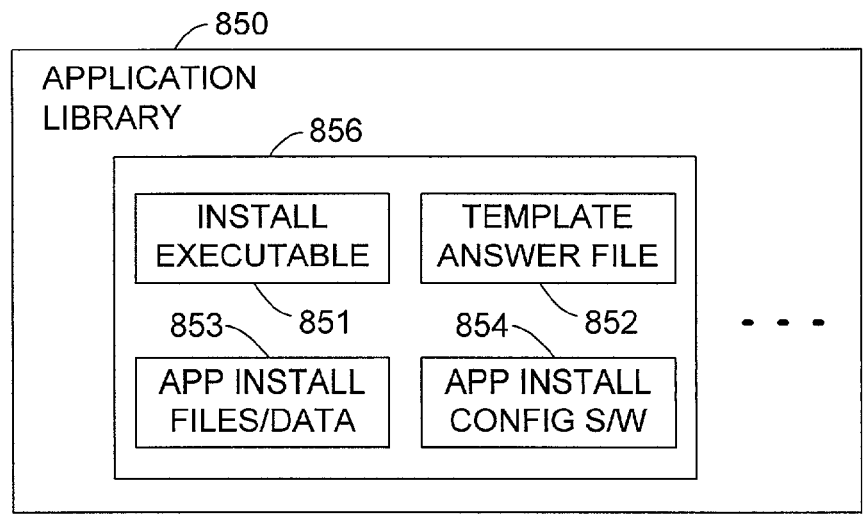

Applications Library 850—FIG. 5

The applications library 850 is a repository of the software and data needed to install an application 856 in a VM. Since the applications are installed by the provisioning engine 810 during deployment phase (see below), they are installed unattended, that is, without any human intervention. Application vendors typically provide ways to install their applications unattended. The common procedure for unattended installation involves running an executable installation file 851 that takes input from a text file, called an "answer file," that specifies the parameters for installation for that application (for example, the folder to install it in) and the installation files/data 853 that need to be copied to the machine (here, virtual machine) that the application is to be installed on.

The application library 850 preferably contains an additional software module (shown in FIG. 5 as an "application install configuration software" module 854) that configures the answer file starting from a template answer file 852 according to the preferences of each user. For example, applications typically have a user who is registered to use that application, a product license key that needs to be specified for installation of the application, etc. The module 854 thus inputs user parameters from the provisioning engine 810, constructs an answer file tailored for that specific user, and writes a copy of this custom answer file (shown as block 864 in FIG. 6) into the temporary usage area 860 for this provisioning session. It also writes the commands that need to be executed to install this application into a portion of the temporary usage area 860 shown in FIG. 6 as "application installation software" block 862.

Figure 6:
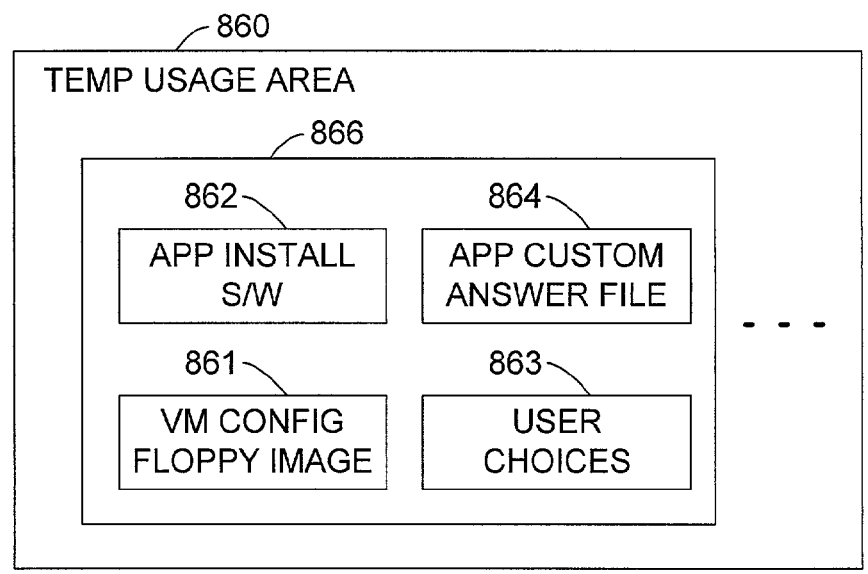

Temporary Usage Area 860—FIG. 6

During the provisioning session, the provisioning server preferably keeps information about the session in a temporary data storage area 860. In particular, for each VM in the process of being provisioned, a corresponding storage space 866 is preferably provided. The data in this component may be discarded after the session is completed.

When the user enters his choices for hardware, operating system, applications, etc., for the VM to be provisioned, this is kept in a data structure shown in FIG. 6 as a "user choices" module 863. The preferred way of representing the user input is in the XML format, because it is in widespread use, is well-standardized and very extensible; moreover, good data parsers are available for this format.

When the provisioning engine 810 deploys a VM on a host, such as host 1000, the VM is powered on and its guest OS is booted. As noted above, before being powered on, the VM will be in a state such that it may execute the configuration software to give the new VM its own identity. The data for this software is specified in an answer file for the operating system configuration. This answer file is preferably written into a floppy image, which the provisioning engine makes available to the VM before it powers it on. The configuration software in the VM then looks for the answer file inside this floppy image. This custom floppy image is shown in FIG. 6 as a "VM config floppy image" 861 and is maintained in the temporary usage area 860.

The custom floppy image for the user is constructed from the template VM config floppy image 834 (FIG. 3), which is present along with the VM in the VM staging server 830. In the preferred embodiment of the invention, the provisioning server performs the following steps to construct the custom floppy image:

1) The template floppy image 834 is copied over to the temporary usage area 860 as the "VM config floppy image" file 861.

2) The provisioning server loads the floppy image on the file system. There are several known ways to do this, depending on the operating system of the provisioning server. For example, in servers whose OS is Linux, this can be done by mounting the floppy image with file system type msdos and using the loopback mechanism. Similar mechanisms exist for Microsoft Windows OSs.

3) The provisioning server runs the floppy image configuration software 835 using the answer file residing inside the floppy image. The configuration software thus takes user input (such as registered user name, product license key, computer hostname, IP address, etc.) and modifies the appropriate fields in the answer file, or adds new fields in it, to produce the custom-tailored answer file for the user.

4) The floppy image is unloaded from the file system. In Linux-based systems, for example, this is done by unmounting the floppy image.

5) The VM config floppy image 861 in the temporary usage area thus constructed is a custom-tailored floppy image for the specific user for this provisioning session.

In an alternate embodiment of the invention, a communication mechanism between the host server and the launch software 833 residing in the VM is used to communicate the user parameters, instead of the answer file being created on a floppy. The launch software uses this data to construct an answer file or to configure the operating system parameters in the guest OS.

The temporary usage area 866 is also used to install additional applications in a custom-built VM. As explained above, in the discussion of the applications library, application install software is copied to the temporary usage area (shown as 862) and the custom answer file for the application is also written into the temporary usage area (864). The VM launch software 833 then establishes a connection (a shared folder, for example) with the temporary usage area on the host server and executes the application install software 862. This software takes the answer file data 864 and installs the applications in the VM. In this embodiment of the invention, the temporary usage area 860 will reside on the host server where the VM is being deployed. The provisioning engine creates the appropriate folders or directories to hold the temporary usage at the beginning of a provisioning session.

Heuristics/Rules Engine 880

When the user has provided to the provisioning server his choices of hardware, system software (such as the OS), and applications, the provisioning server passes this information to the heuristics/rules engine 880, which then matches the information against the database 890 to select the appropriate host and the VM hardware configuration. As its name implies, the heuristics/rules engine implements heuristics, which may be determined using normal design methods, but which may vary from implementation to implementation. A sample algorithm, used in a prototype of the invention, that the heuristics engine follows is as follows:

1) If Operating System O1 is selected, then at least M amount of memory and D amount of disk space is required in the VM.

2) For each application selected, add the application's required memory and disk space.

3) Increase the memory and disk space calculated by a heuristically determined factor depending on the OS and applications selected.

4) If the required memory or disk space is higher than the user-specified amounts, recommend to the user the amount determined.

5) Scan the list of available host machines 1000, 1001, etc., and determine the one with enough memory and disk space to host the VM about to be created. This may be done, for example, by querying the host via an API provided to manage VMs.

6) Request the host (using the API) to reserve the amount of memory and disk space required.

7) Return the configuration of the host and of the VM's requested hardware to the provisioning server.

Task Manager 820

The job of the task manager is to monitor and manage the entire provisioning session. When the user submits a request to provision a new VM, the provisioning engine requests that a new task be created, and the task manager 820 returns a task ID that identifies the task. This task ID is preferably also returned to the user. The user can then perform various operations via the user console 801. One such operation is to submit a query concerning the status of the task. The task manager in turn, using known methods, then queries the provisioning engine, which determines the stage where the provisioning process is at, and, if possible, the percent of completion of that stage.

Another operation is to abort a given task, in which case the task manager directs the provisioning engine 810 to halt the given task. The provisioning engine then aborts the process running the task and reverts the state of the host machine by removing any files that were copied to both the host and the temporary usage area. It also releases the memory and disk space resources held on the host.

If an unrecoverable error occurs during any of the provisioning operations the provisioning process can request the task manager to abort the given task, which will then clean up the intermediate state, which may also be done using known methods. This provides a transaction semantic to the provisioning operation—either the entire process completes successfully or it fails, in which case the state of the system is essentially restored as if the provisioning process never started.

Provisioning Engine 810

The provisioning engine is the component that ties together the various components described above. The provisioning engine preferably takes each user request and runs the corresponding provisioning operation as a separate process. An algorithm used in a prototype of the invention for provisioning a fully configurable (custom-built) VM is as follows:

1) Get a new task ID from the task manager 820.
2) Call the heuristics engine 880, to determine the VM's hardware configuration and the host to deploy on.
3) If the heuristics engine returns an error, call the task manager to abort this task and inform the user about the error, or invoke and implement some other rule base to suggest action.
4) Create a new temporary usage area 860 for this task on the host server.
5) Store the user input in the user input (choices) file 863 in the temporary usage area.
6) Create the VM config floppy image 861 from the template floppy image 834 for the VM, as described above in the "Temporary Usage Area" section.
7) For each application selected by the user, create the custom answer file 864 and the application installation software 862 using the process described above in the "Application Library" section.
8) Copy the VM's config file and the disk files to the host.
9) Call the API in the host to register this new VM.
10) Call the API in the host to connect the VM config floppy image to the VM.
11) Call the API in the host to power on the VM. This causes the configuration script in the VM to configure the operating system parameters using the data in the config floppy image; it also causes installation of the applications
12) If there is any error during step 11, call the task manager to abort the task.
13) When the configuration step successfully completes, call the API in the host to power the VM down.
14) Clean up the temporary usage area and inform the user of the successful completion of the task.

For provisioning an instantly-deployable VM, the algorithm followed in the prototype of the invention was as follows:

1) Get a task ID from the task manager 820.
2) Call the heuristics engine to determine the host to deploy on.
3) Create a temporary usage area 860 and store the user input in it.
4) Copy the VM's config file 842, REDO logs 843 for the disks 841 and suspend-to-disk image file 844 to the host.
5) Modify the config file for the VM to access the disk remotely on the server.
6) Call the API on the host to register the VM.
7) Call the API in the host to resume the VM.
8) Clean up the temporary usage area and inform the user of successful completion of the task.

Administrative ("Admin") Console 802

The admin console is used by administrators to manage and monitor the entire system. Typical tasks include:

1) Manage the various components of the provisioning server. These tasks include adding/removing a staged VM to the pool 830, adding/removing an application in the application library 850, adding/removing a host form the pool of host severs 1000 1001, etc. The database 890 is also updated to reflect the change in the configuration of the components.
2) Managing users that are allowed to access the provisioning server. This includes adding or removing users, assigning or changing authorization levels for the users, etc.
3) Monitoring the deployed VMs and hosts for unexpected events such as the guest OS in the VM crashing, the host going down, etc., and alerting the administrators by sending a message on the console 802 or sending an email.
4) Monitoring the usage by the users in terms of how many times they have provisioned a VM or the duration that they have used a deployed VM. This can be used for billing purposes.

Remote Provisioning

In the description of the various embodiments of the invention above, it has been is assumed that the user inputs his configuration requests via the user console 801, which is considered as a part of the provisioning server as a whole. This assumption is made simply by way of example, and is not necessary to the invention. Rather, assuming sufficient bandwidth and a high enough transfer speed, it would also be possible for all interaction between the user 900 and the provisioning server 800 to take place via the network 700.

Thus, the user could log into the provisioning server, which would download the various dialog screens to the user in any conventional format such as HTML. The user could then enter his configuration request via his own browser. After the requested VM has been provisioned, it could be downloaded to a user-specified destination or file, whereupon the user could install the downloaded VM onto a host and power it up using known methods.

Computer-Generated Provisioning Requests

It is also not strictly necessary for the user to be human, although this will be the most commonly anticipated application of the invention. Instead, as long as a protocol is agreed upon (in terms of a well-defined programmatic interface or API) by the provisioning server and an external (possibly remote) computer system, then the external computer could itself input VM provisioning requests to the provisioning server. This arrangement would be beneficial in the context of testing, in which a very large number VMs having different hardware/OS/application combinations need to be provisioned. The external computer could then be programmed to request all the needed combinations, run the VMs, and log the results. Using the invention, such testing of many configuration combinations could therefore be made substantially wholly automatic.

Provisioning a Network of Computers

The invention described above is easily extensible to provisioning more than one computer at a time, where the various computers have applications that are configured to interact with applications on other computers. In such implementations, the provisioning engine assigns new identities to the computers and also configures the applications within them, and as it does that it re-configures the applications such that the interactions continue to work even when the computers have a new identity.

An example of where this would be useful is where a developer wants to test his web application, which uses a web server on one computer, an application server on another, and a database server on yet another. The web server may then be configured to connect to the application server, which in turn is configured to connect to the database server. Another example is where a web application is tested against a large number of clients simulating web accesses: The user provisions one computer with the web server application and several computers with the testing application.

VM Provisioning and Hosting Service

The invention as described above is also easily amenable to implementing a method for doing business by charging users a fee for each VM provisioned and/or deployed, based on the number and type of components included in a deployed VM, as a function of time of actual or available use, or any combination of these or other possible fee structures.

Figure 7:
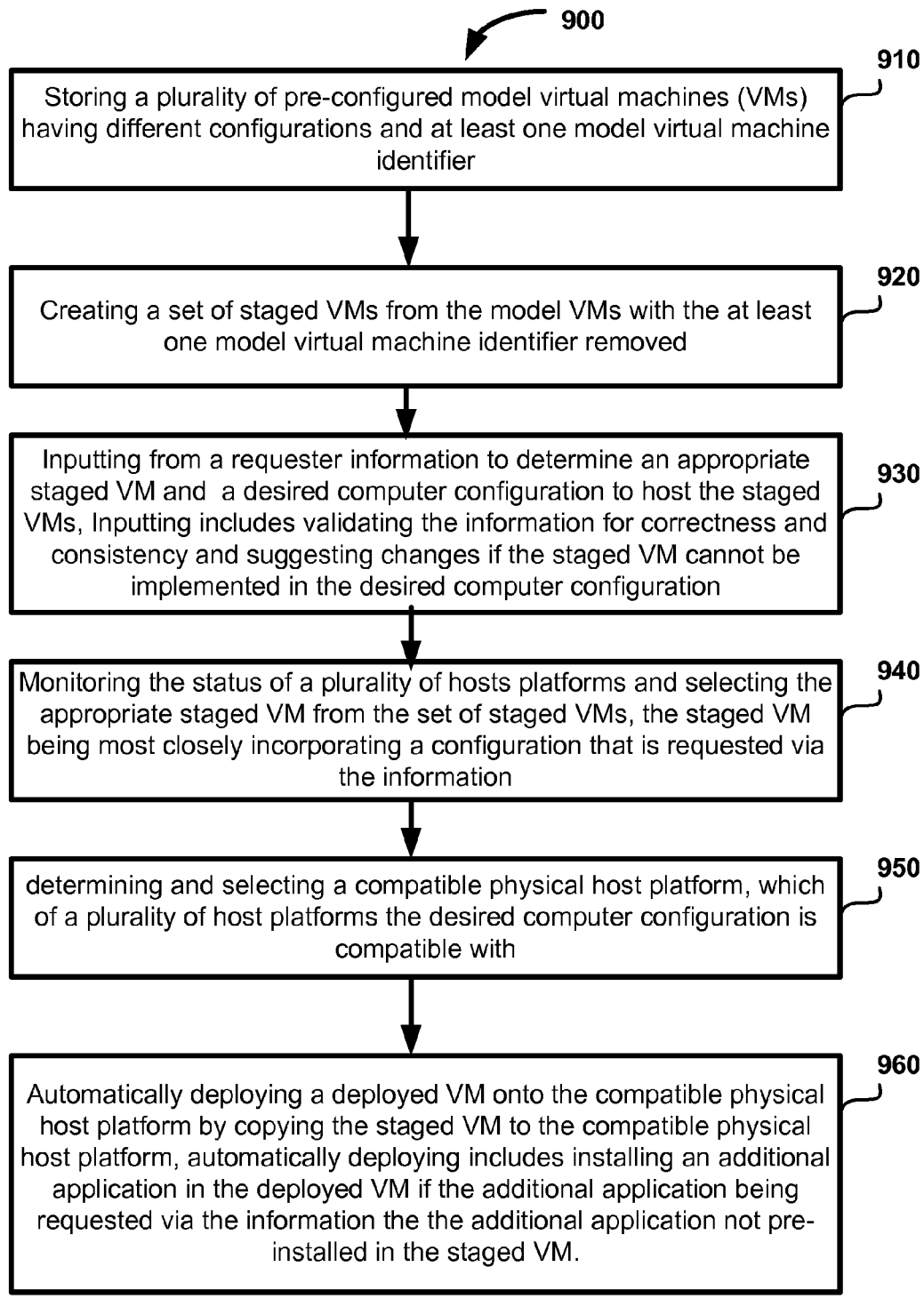
FIG. 7 illustrates a method of creating a virtualized computer system.

FIG. 7 illustrates a method 900 of creating a virtualized computer system. At step 910 a plurality of pre-configured model virtual machines (VMs) having different configurations and at least one model virtual machine identifier are stored. At step 920 a set of staged VMs are created from the model VMs with the at least one model virtual machine identifier removed. At step 930 a requester inputs information to determine an appropriate staged VM and a desired computer configuration to host the staged VM. The input is validated for correctness and consistency and changes are suggested if the staged VM cannot be implemented in the desired computer configuration. At step 940, the status of a plurality of hosts platforms is monitored and the appropriate staged VM is determined and selected from the set of staged VMs. The staged VM most closely incorporates a configuration that is requested via the information. At step 950 a compatible physical host is determined and selected from a plurality of host platforms. At step 960 a VM is automatically deployed onto the compatible physical host platform by copying the staged VM to the compatible physical host platform. The automatically deploying includes installing an additional application in the deployed VM if the additional application being requested via the information and the additional application not pre-installed in the staged VM.

What is claimed is:

1. A method for creating a virtualized computer system comprising:

storing a plurality of pre-configured model virtual machines (VMs) having different hardware and software configurations, wherein each of the model VMs have at least one model virtual machine identifier;

creating a set of staged VMs from the model VMs by, for each of the model VMs, include software to configure operation system parameters to establish a connection to a server comprising additional data needed to provision staged VMs onto physical host platforms and strip an identity, wherein stripping the identity comprises removing the at least one model virtual machine identifier;

inputting from a requester, information to determine an appropriate staged VM and a desired computer configuration to host the staged VM, wherein the inputting includes validating the information for correctness and consistency and suggesting changes if the staged VM cannot be implemented in the desired computer configuration;

determining and selecting the appropriate staged VM from the set of staged VMs, the staged VM being most closely incorporating a configuration that is requested via the information;

monitoring a status of a plurality of hosts platforms and heuristically selecting a compatible physical host platform from the plurality of the host platforms that is compatible with the desired computer configuration and best suited for hosting the staged VM; and automatically deploying a deployed VM onto the compatible physical host platform by copying the staged VM to the compatible physical host platform, the deployed VM thereby obtaining a new identity by obtaining at least one new identifier different from the at least one model virtual machine identifier that identified the staged VM, wherein the automatically deploying includes installing an additional application in the deployed VM if the additional application is being requested via the information and the additional application is not pre-installed in the staged VM.

2. The method as in claim 1, in which the inputted information includes characteristics of a desired operating system.

3. The method as in claim 1, in which the inputted information includes characteristics of a desired hardware platform.

4. The method as in claim 1, in which the requester is a human user, the method further comprising the following steps:

storing a plurality of virtualized hardware configurations, a plurality of operating systems, and a plurality of applications;

displaying for the user lists of the stored virtualized hardware configurations, operating systems, and applications;

sensing selection by a requester of a desired one of the virtualized hardware configurations, a desired one of operating systems, and of any of the applications; and automatically configuring a virtual machine with the selected hardware configuration, operating system, and applications.

5. The method as in claim 1, in which the requester is a computer program.

6. The method as in claim 1, further including the step of automatically migrating the deployed virtual machine from one host to another based on the monitored status of the plurality of hosts.

7. The method as in claim 1, further including the following steps:

installing a virtual machine-to-hardware interface on each of a plurality of hardware hosts;

selecting at least one of the hardware hosts for hosting; and deploying a virtual machine on each selected hardware host, each of which thereby forms a separate physical host platform;

whereby deployment of the virtual machine is substantially independent of the overall physical hardware configuration.

8. The method as in claim 1, in which the step of inputting information identifying the desired computer configuration comprises inputting an image of an existing physical computer.

9. The method as in claim 1, further comprising:

deploying a virtual machine on each of a plurality of physical host platforms;

installing in at least two of the deployed virtual machines different, mutually interacting applications, the at least two of the deployed virtual machines thereby forming a network.

10. A system for creating a virtualized computer system comprising a plurality of physical host platforms and a provisioning server, which comprises:

a database storing a plurality of pre-configured model virtual machines (VMs) having different hardware and software configurations, wherein each of the model VMs have at least one model virtual machine identifier;

a staging module creating a set of staged VMs from the model VMs by, for each of the model VMs, include software to configure operation system parameters to establish a connection to a server comprising additional data needed to provision staged VMs onto physical host platforms and strip an identity, wherein stripping the identity comprises removing at least one model virtual machine identifier; and a provisioning engine receiving information from a requester to determine an appropriate staged VM and a desired computer configuration to host the staged VM, wherein the receiving includes validating the information for correctness and consistency and suggesting changes if the staged VM cannot be implemented in the desired computer configuration, determining and selecting the appropriate staged VM from the set of staged VMs, the staged VM being most closely incorporating a configuration that is requested via the information, monitoring a status of a plurality of hosts platforms and heuristically selecting a compatible physical host platform from the plurality of host platforms that is compatible with the desired computer configuration and best suited for hosting the staged VM, and automatically deploying a deployed VM onto the compatible physical host platform by copying the staged VM to the compatible physical host platform, the deployed VM thereby obtaining a new identity by obtaining at least one new identifier different from the at least one model virtual identifier that identified the staged VM, wherein the automatically deploying includes selecting and installing an additional application in the deployed VM if the additional application is being requested via the information and the additional application is not pre-installed in the staged VM.

\* \* \* \* \*

UNITED STATES PATENT AND TRADEMARK OFFICE
CERTIFICATE OF CORRECTION

PATENT NO. : 7,577,722 B1  Page 1 of 1
APPLICATION NO. : 10/117143
DATED : August 18, 2009
INVENTOR(S) : Khandekar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1599 days.

Signed and Sealed this

Seventh Day of September, 2010

David J. Kappos
*Director of the United States Patent and Trademark Office*